(No Model.)
A. J. OEHRING.
UNIVERSAL JOINT.
No. 478,811. Patented July 12, 1892.
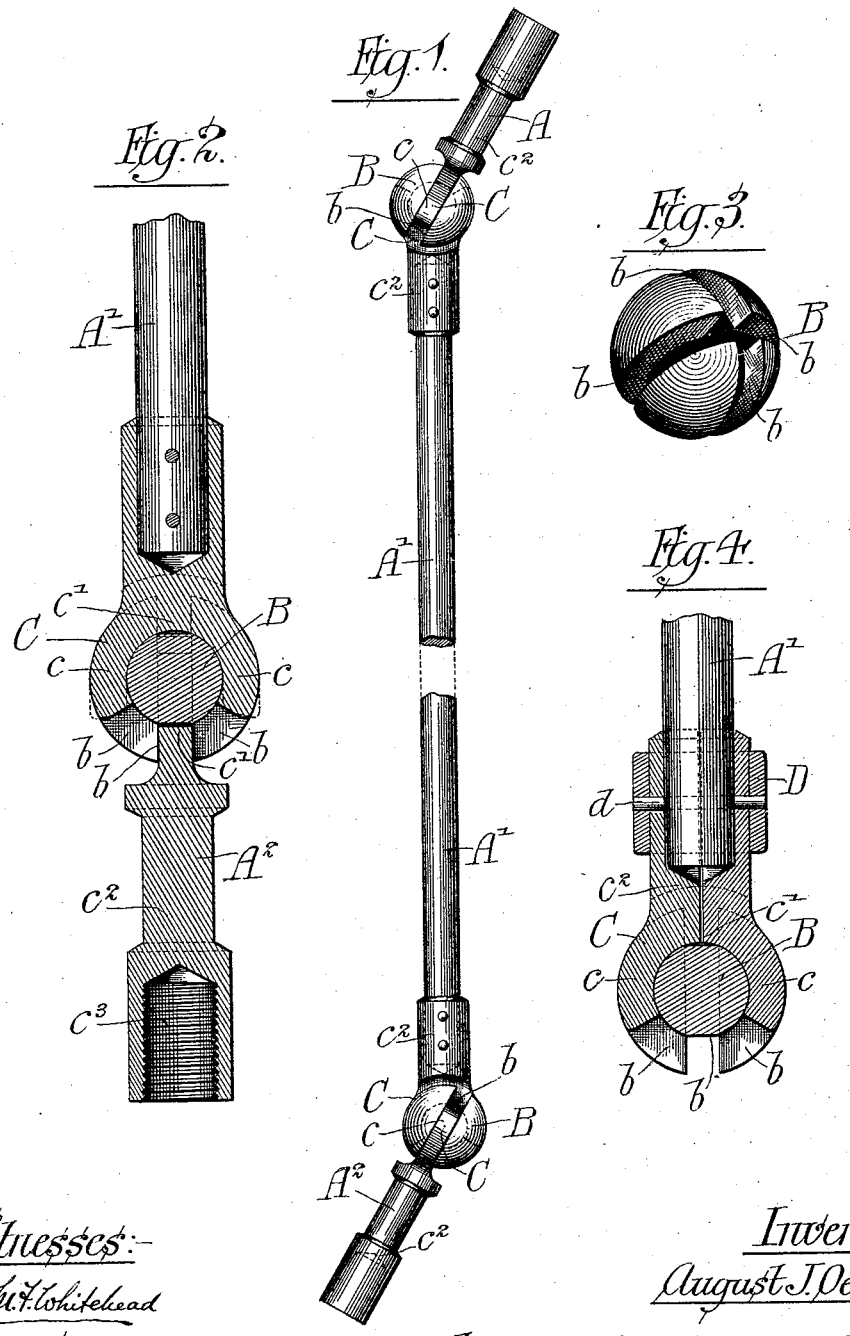

UNITED STATES PATENT OFFICE.

AUGUST J. OEHRING, OF CHICAGO, ILLINOIS.

UNIVERSAL JOINT.

SPECIFICATION forming part of Letters Patent No. 478,811, dated July 12, 1892.

Application filed September 25, 1891. Serial No. 406,826. (No model.)

*To all whom it may concern:*

Be it known that I, AUGUST J. OEHRING, of Chicago, in the county of Cook and State of Illinois, have invented certain new and useful Improvements in Universal Joints; and I do hereby declare that the following is a full, clear, and exact description thereof, reference being had to the accompanying drawings, and to the letters of reference marked thereon, which form a part of this specification.

This invention relates to universal joints, and has for its object to provide a simple and efficient joint whereby two members of a shaft or other like device may have free play with regard to each other in all directions within reasonable limits, while at the same time rotary motion imparted to the one member will be transmitted to the other.

To this end my invention consists in certain novel features, which I will now proceed to describe, and will then particularly point out in the appended claims.

In the accompanying drawings, Figure 1 is an elevation of a shaft embodying my invention. Fig. 2 is a central longitudinal sectional view illustrating the mode of assembling the parts. Fig. 3 is a perspective view of the ball detached. Fig. 4 is a detail sectional view illustrating a modification.

In the said drawings I have chosen to show my invention as applied to a flexible shaft, of which I have shown three members A A' A². It will, however, be understood that this is only one application of my present invention, used solely for purposes of illustration.

The joint proper, to which my invention particularly relates, consists of an integral ball or sphere B, formed in a single piece, and forks C, embracing the same. The ball B is provided with two circumferential grooves $b$, arranged at a distance of ninety degrees from each other, so as to cross or intersect each other at right angles. These grooves are rectangular in cross-section, as shown. Each fork C is composed of two prongs $c$, rectangular in cross-section to fit the grooves $b$, and a similarly-shaped intermediate portion $c'$, curved to fit the curvature of the bottom of the said grooves.

In assembling the parts the two forks C are placed one in each of the two grooves $b$, being therefore arranged in planes at right angles to each other. The arms $c$ of each fork extend somewhat beyond the middle line of the ball B, as shown in dotted lines in Fig. 2, and the ends of these arms are then bent inward upon the ball into the position shown in full lines in said figure, in which position they rest upon the bottom of the grooves $b$ and engage and hold the ball, preventing separation of the forks and ball. The forks C may be connected with the members of the shaft or other device in any suitable manner—as, for instance, by forming in the shank $c^2$ of the fork a threaded socket $c^3$, into which the correspondingly-threaded end of the member screws. The forks may, however, be connected with the members by pins or in any other approved manner, or they may be formed integral therewith.

Although I prefer to form the forks in the manner just described, and shown in Figs. 1 and 2, yet it is obvious that instead of forming each fork in one piece and bending the projecting ends around the ball, it may be made in two separable halves, shaped to fit the ball and secured together in any suitable manner after being applied thereto. In Fig. 4 I have shown such a modification, in which the shank $c^2$ and part $c'$ are divided centrally, being secured together by a collar D and pin $d$, which latter serves to secure the end of the member to which the fork is to be united. It will be noted that in this case the members $c$ are shaped to fit the ball throughout their length before being applied thereto. It will be observed that when the joint is applied, as in the construction shown, to a rotating shaft, wherein all or most of the strain is torsional, the broad flat bearing between the arms of the forks and the side walls of the grooves forms a bearing-surface practically indestructible by ordinary wear, while smoothness of movement without lost motion is assured. Whether applied to this particular form of mechanism or to other forms, the joint is simple, cheap, and efficient, and is readily assembled and of great durability. Moreover, there are no projecting parts which might render the device dangerous when in operation, the external surface being entirely smooth.

What I claim is—

1. A universal joint comprising an integral ball or sphere provided with two circumferential annular grooves of equal depth throughout their extent, concentric with the sphere and arranged at right angles to each other, and two forks arranged in planes at right angles to each other and constructed and arranged to fit said grooves and embrace and hold said ball, substantially as described.

2. A universal joint comprising an integral ball or sphere provided with two annular grooves rectangular in cross-section, of equal depth throughout their extent, concentric with the sphere, and arranged at right angles to each other, and two forks also rectangular in cross-section and arranged at right angles to each other, said forks being constructed and arranged to fit said grooves throughout their entire extent, so as to embrace and hold said ball, substantially as described.

In testimony that I claim the foregoing as my invention I affix my signature in presence of two witnesses.

AUGUST J. OEHRING.

Witnesses:
IRVINE MILLER,
C. A. NEALE.